July 16, 1946.  J. A. FRIED  2,403,971
METHOD OF MAKING MICA CAPACITORS
Filed March 31, 1941
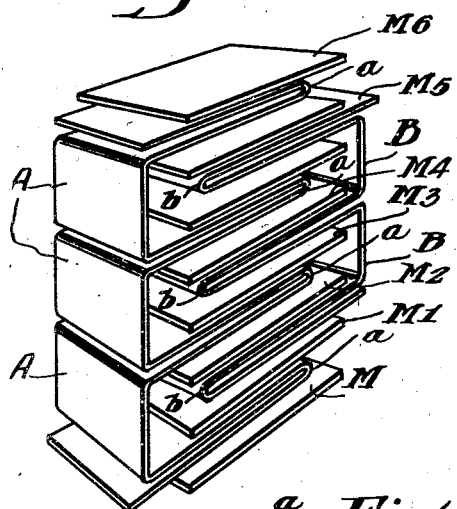
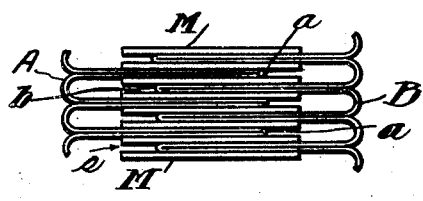
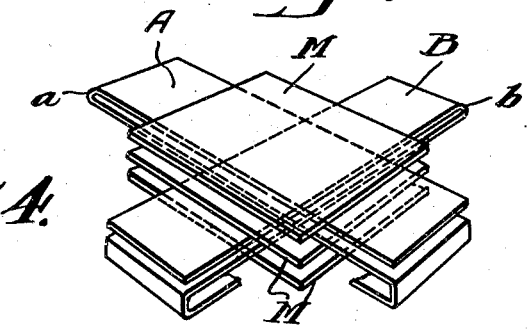
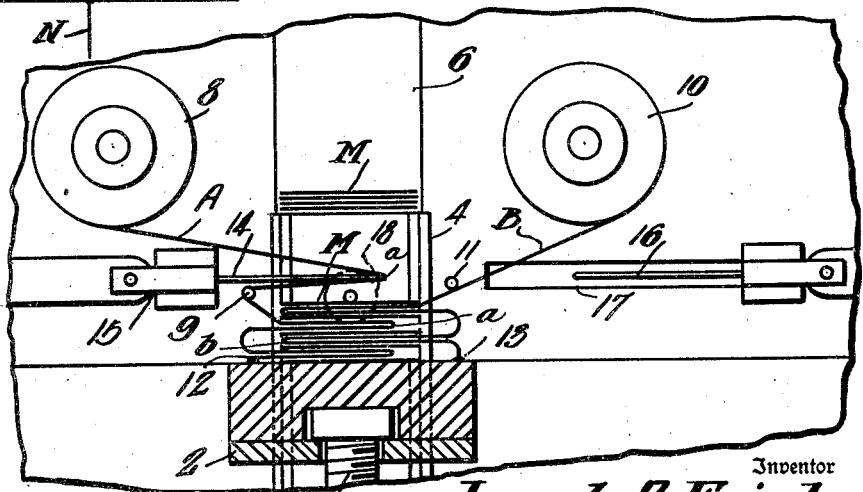
Inventor
Joseph A. Fried
By
Attorney Patented July 16, 1946

2,403,971

UNITED STATES PATENT OFFICE 2,403,971

METHOD OF MAKING MICA CAPACITORS

Joseph A. Fried, Haddon Heights, N. J., assignor to Radio Corporation of America, a corporation of Delaware Application March 31, 1941, Serial No. 386,133

3 Claims. (Cl. 270—32)

This invention relates to fixed mica-capacitors and to methods of making the same.

Although the prior art is replete with methods and apparatus for manually or automatically stacking the separate foil and mica "plates" of which mica-capacitors are comprised, the difficulties incident to handling and aligning a multiplicity of such separate thin plates continue to result in the production of an undesirably high percentage of non-usable units. Obviously, it affords no solution of this problem to suggest (see U. S. Patents Nos. 709,205, 1,395,931 and 1,415,220) the use of folded paper as the dielectric since, usually, the desired electrical characteristics can only be achieved by the use of discrete mica-dielectric elements.

Accordingly, the principal object of the present invention is to provide a simple, inexpensive and trouble-free automatically stacked mica-capacitor of novel construction and one which will afford the minimum number of non-usable units when manufactured by mass production methods.

The foregoing and other objects are achieved in accordance with the invention by the provision of a capacitor wherein the positive and negative armatures comprise a pair of accordion-pleated strips of metal-foil arranged with the pleats of one strip overlapping the pleats of the other strip, and wherein the dielectric elements are in the form of discrete plates interposed between adjacent surfaces of the said overlapping metal pleats or folds.

Certain details of construction will be apparent and the invention itself will be best understood by reference to the following specification and to the accompanying drawing, wherein Figure 1 is an exploded view in perspective showing a mica-capacitor within the invention, in the process of construction;

Figure 2 is a side elevational view of the capacitor stack of Fig. 1 subsequent to its compression;

Figure 3 is a view in perspective of another embodiment of the invention;

Figure 4 is a top plan view of the mica capacitor of Figure 3 subsequent to the installation of terminal leads, and Figure 5 is a partly diagrammatic sectional view of a machine for manufacturing capacitors in accordance with the invention.

Like reference characters designate the same or corresponding parts in all figures.

In the capacitor stack shown in Figures 1 and 2, A and B designate, respectively, two oppositely located accordion-pleated strips of conducting material, such as aluminum-foil, or the like, arranged with the folds or pleats $a$ of one strip extending toward and overlapping the folds $b$ of the other strip, and M, $M^1$, and $M^2$, etc., designate a number of plate-like pieces of mica or other suitable dielectric, which are interposed, respectively, between the adjacent outer or "top" and "bottom" surfaces of the conductive folds $a$ and $b$. It will be observed that the inner faces of each fold or pleat lie contiguous to each other substantially throughout their length and that there is no insulating or dielectric material between the said inner faces. The conductive double layers or pleats $a$, $b$ comprise, respectively, the "alternate" and "intermediate" armatures of the capacitor and are offset in the lateral direction as indicated at $s$ (Fig. 2) to prevent short circuits. The dielectric sheets M extend beyond the side edges of the pleats or armatures $a$ and $b$ to prevent the possibility of a short circuit when the stack has been compressed and a voltage applied. As in the case of the usual capacitor stack all of the alternate $a$ and all of the intermediate $b$ armatures extend in opposite directions beyond the other edges of the mica a distance sufficient to permit the attachment thereto of the terminal leads which are necessarily employed when the stack is embedded or otherwise housed in a suitable casing or other container, not shown.

When mica is employed as the dielectric, the separate sheets may each be provided with a dry coat of styrol, polystyrol or equivalent thermoplastic material prior to their assembly (as disclosed in U. S. Patent 2,223,833 to Morris Sander) and the otherwise completed capacitor stacks or sections subsequently placed under mechanical pressure and raised to a temperature of about 100° C., preferably in vacuo. The styrol softens and flows under pressure, slowly driving out moisture and filling up all margins and, when cooled, forms a rigid embedment free from voids and sealed against moisture.

The invention is not limited to a construction wherein the conductive pleats or folds which comprise the oppositely polarized armatures of the capacitor extend in parallel directions as in the device of Figs. 1 and 2. Thus, in the capacitor stack of Figs. 3 and 4, the alternate and the intermediate metal folds or armatures $a$ and $b$, respectively, are disposed at right angles to each other and each fold extends beyond two opposite edges of the mica sheets M, instead of beyond but one edge thereof, as in the device of Figs. 1 and 2. As in the first described embodiment of the invention, the marginal edges of each piece of mica preferably extend beyond those edges of a given fold which are parallel to the direction of extension of that fold, so that short circuits between the oppositely polarized alternative and intermediate folds are prevented when a voltage is applied thereto.

Where, as in the device of Figs. 3 and 4, each alternate (a) and intermediate (b) armature extends beyond two edges of the mica sheets (M) the necessarily separate electrical leads for the discrete groups of armatures may each extend to both ends of the armatures to which they are allotted. Thus, as shown in Fig. 4, the lead L may be connected to both ends of the "alternate" armatures a, and the lead N to both ends of the "intermediate" armature b.

Fig. 5 shows one type of an automatic stacking machine which may be employed in manufacturing capacitors in accordance with the invention. In the drawing, 2 designates a vertically movable rectangular base which is preferably provided near each one of its corners with a guideway 4 which communicates with a magazine 6 containing a supply of mica plates M. Mounted at fixed points on opposite sides of the base 2 are two spools 8 and 10 each containing a strip of metal foil A and B, respectively. The free end of each of the strips A and B passes beneath a curved guide 9 or 11 and is secured to the base, as indicated at 12 and 13. A pair of tongue-like members 14 and 16, which are mounted for reciprocating movement, as on tracks 15, 17, on opposite sides of the base serve to draw the anchored foils A and B over the guides 9 and 11, respectively, and across the base 2. As each reciprocating tongue 14 and 16 alternately completes its movement, a fold or pleat of metal is formed above the base, whereupon a suitable trigger mechanism, indicated generally at 18, serves to deposit a mica plate M upon that fold. Simultaneously with the movement of the trigger mechanism guides 9 and 11 cyclically are withdrawn from each member of the foil after being formed by the reciprocating tongues 14 and 16 and later brought into a loop forming position prior to the formation of the next loop. The movement of members 9 and 11 is made by any suitable gear and linkage means, not shown. A worm driven screw 19 or other suitable mechanism affixed to the underside of the base 2 serves to synchronously lower the base as the reciprocating tongues pile up the assembled capacitor stack or stacks thereon. Obviously, in adapting this mechanism to the manufacture of the capacitor shown in Figs. 3 and 4, the reciprocating tongues 14 and 16 may be arranged at right angles instead of opposite each other and the extent of their reciprocating movement adjusted by any suitable means to the requirements of the capacitor under construction.

Other modifications of the invention will suggest themselves to those skilled in the art. It is to be understood therefore that the foregoing is to be interpreted as illustrative and not in a limiting sense except as required by the prior art and by the spirit of the appended claims.

What is claimed is:

1. The method of making an automatically stacked capacitor which comprises forming, in a continuous strip of metal, a plurality of folds each one having two outer faces and a pair of inner faces which lie contiguous to each other throughout the greater portion of their lengths, depositing a dielectric element of larger area than said folds and located with three side margins upon an outer face of each one of said folds, forming a similar number of folds in another strip of metal which alternately extend in from an opposite side of said first mentioned folds and alternately depositing a similar dielectric element with three similar side margins upon an outer face of each one of said folds which are located opposite said first mentioned folds.

2. Method in accordance with claim 1 and wherein said metal folds are caused to extend in parallel directions.

3. Method in accordance with claim 1 and wherein said metal folds are caused to extend substantially at right-angles to each other.

JOSEPH A. FRIED.